Sept. 20, 1960     H. B. NILSSON     2,953,725
SENSING MEANS
Filed Oct. 22, 1956
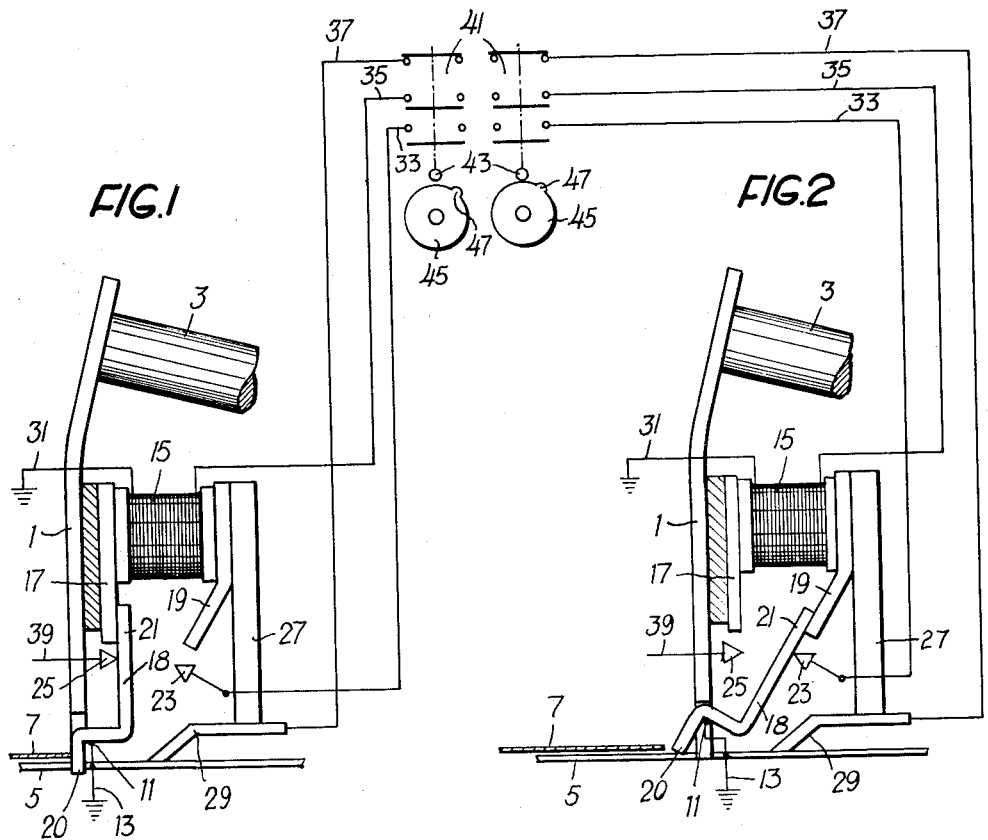
INVENTOR.
Herman Bertil Nilsson
BY
Pierce, Scheffler & Parker
his Attorneys United States Patent Office 2,953,725
Patented Sept. 20, 1960

2,953,725
SENSING MEANS

Herman B. Nilsson, Solna, Sweden, assignor to Aktiebolaget Inventing, Stockholm, Sweden, a corporation of Sweden Filed Oct. 22, 1956, Ser. No. 617,601

4 Claims. (Cl. 317—123)

The present invention relates to sensing means, particularly in combination with a device for controlling the position of a sheet on a support, for instance in a printing machine for the control of the position of the sheets fed to the machine, which positioning, as is well known, must be very accurate in for instance multi-colour printing.

The general object of the invention is to determine the position of an element actuable by small forces in relation to a predetermined reference position in such manner as to obtain contact closing with sufficient contact pressure by simple means in dependency on deviations of said elements from said reference position in one or the opposite direction.

A device according to the invention is characterized by an electro-magnet with two pole shoes between which there is an air gap, said element having a ferromagnetic portion occupying in the reference position of said element such a position in the air gap that the forces of attraction on said element from the two pole shoes are equal when the electromagnet is energized, contact means being arranged to be actuated by said element when the ferromagnetic portion is attracted to the one or the other pole shoe.

The force acting upon said element on the deviation to be determined may in such a device be substantially lower than the minimum force required for effecting contact closing with sufficient contact pressure for the purpose of indicating said deviation. A device according to the invention can be used for many different purposes, for instance for determining the deviation of an element actuated by a weak flow of air or otherwise by a very weak force. Hereinbelow the invention shall be more clearly described in connection with the accompanying drawing as applied to a device for sensing or controlling the position of a sheet on a support. In this device the element operable by small forces is constituted by a pivotable element arranged so as to be actuated by an edge of the sheet material. In the drawing Fig. 1 shows the sensing device in the correct position of the sensed sheet, while Fig. 2 shows the device in an incorrect position.

The device according to the drawing consists of a supporting frame in the form of a plate 1 secured to an arm 3 and provided with an electromagnet 15, a sensing element 18 and a further element as will be described more clearly hereinbelow. The device is intended for the control of the position of a sheet 7 on a support 5. It may for instance be the question of controlling the position or the orientation of the paper sheets to be fed to the printing cylinders in a sheet printing press. The arm 3 carrying the entire sensing device may be pivoted up and down about an axis (not shown) perpendicular to the plane of the drawing, and it is further assumed that the paper 7 is fed from the left to the right according to the figures. The electromagnet 15 has first and second pole shoes 17 and 19, respectively, between which an air gap exists in which the upper end 21 of the sensing element 18 pivotably secured to the plate 1 is movable.

The pivot axis 11 for the element 18 is perpendicular to the plane of the drawing and the element 18 passes here from the rear through the plate 1 and has a downwardly directed portion 20 at the front side of the plate 1, said portion extending somewhat beneath the surface of the support 5 and is intended to cooperate with an edge, i.e. the front edge in the present case, of the sheet 7.

The element 18 is arranged to effect contact closing with at least one fixed (or somewhat resilient) contact. The drawing shows two such fixed contacts 23 and 25 which are provided in such manner that a reliable contact closing, i.e. with sufficiently high contact pressure, is obtained when the portion 21 of the element 18 comes into engagement with the pole shoe 19 or 17 of the magnet 15.

The device comprises also a switching device 41 in a current circuit which is adapted to interrupt the current to the driving motor of the printing press or to otherwise stop the feeding of the sheet 7 if the latter has been fed to an incorrect position on the support 5. Such a current circuit may be devised in different ways and is therefore not shown in the drawing. The switching device 41 is operated by a cam disc 45 coupled to a rotating part of the printing machine, said disc having a cam 47 adapted to cooperate with a cam follower 43 connected to the movable contacts of the switching device 41 in such manner that the switching device effects a short current closing during each revolution of the cam disc 45. The switching device effects current closing in three current circuits, according to the shown embodiment. One current circuit of the feed stop means includes the conductor 33 from the switching device to the fixed contact 23 cooperating with the sensing element 18 and further via the element 18 and the conductor 13 to earth. An energizing current circuit extends via the conductor 35 from the switching means to the electromagnet 15 and further via the conductor 31 to earth. A circuit of the feeding means includes the conductor 37 from the switching device to a resilient contact 29 on a support 27 which is rigidly connected with the magnet 15 and the plate 1 and preferably consists of insulating material.

In conceivable modifications of the current circuits for interrupting the feeding of sheets 7 on the support 5, as mentioned above, also the contact 25 cooperating with the element 18 may be included via a conductor 39 in a current circuit controlled by the switching device.

The contact 29 is adapted to effect contact closing with the electrically conducting support 5 or a suitable counter contact at a point close behind the plate 1.

The described embodiment operates as follows. When the arm 3 which is pivoted upwardly and downwardly according as the sheets 7 are being fed by means of a device (not shown) has been lowered to the sensing position according to the figures, a sheet 7 is fed on the support 5. If the sheet has been fed forwards sufficiently, its front edge actuates the portion 20 of the sensing element 18 so that the sensing element is pivoted in the counter-clockwise direction about the axis 11. The switching device 41 then effects a short closing of the current by means of the cam 47, the magnet 15 receiving current and attracting the portion 21 of the element 18 to the pole shoe, to which this portion just had approached when the element 18 was actuated by the paper sheet 7. By the resulting force of attraction the portion 21 comes into tight abutment against the pole shoe 17 according to Fig. 1 and a contact closing with sufficient contact pressure is obtained between the portion 21 and the fixed contact 25 which, however, in the shown embodiment is not inserted in a current circuit so that a current closing in the circuit for interrupting the feeding of the sheets does not take place. The feeding of the sheets 7 therefore continues until a sheet has been fed into an incorrect position on the support. Such a case is shown in Fig. 2.

In this figure it has been assumed that the sheet 7 has not been fed forwards sufficiently on the support 5. Therefore the sheet does not actuate the portion 20 of the sensing element 18.

The sensing element 18 is devised in such a manner that if not actuated by a sheet 7, it occupies a resting position in which the portion 21 on energization of the magnet 15 always will be attracted to the pole shoe 19 of the magnet, which in the shown embodiment has been achieved by the action of the force of gravitation upon the portion 21, but of course can be reached in other ways, for instance by means of a weak spring force acting upon the element 18 which force cannot substantially counteract the setting of the sensing element 18 that is effected by the sheet 7 when the latter has been fed to the correct position on the support.

When the magnet 15 according to Fig. 2 receives a current impulse from the switching device 41 contact closing is effected as before between the portion 21 and a fixed contact, now the contact 23, under sufficiently high contact pressure, and thereby a current circuit for interrupting the feeding of the sheets 7 on the support is closed. The incorrectly positioned sheet according to Fig. 2 is thereafter removed in a manner not to be described.

If the sheet 7 for some reason should be fed forwards too far on the support, before the sensing means has come into the position shown in the drawing, it will insulate the contact 29 from the support upon lowering of the sensing device into the shown position, the circuit controlled by the contact 29 being likewise adapted to interrupt the feeding of the sheets for removal of the incorrectly positioned sheet.

The invention is not restricted to the shown and described embodiment which may be modified in different manners without departing from the scope of the invention, and the invention is neither restricted to the field of application of the shown embodiment.

What I claim is:

1. Sensing apparatus for interrupting the feed of an article upon a support in accordance with its relative position thereon comprising a frame, an electromagnet secured to said frame, said electromagnet having first and second spaced pole shoes, a movable contact pivotally connected to said frame and having a magnetic portion intermediate said pole shoes, said movable contact normally having a position in engagement with said first electromagnet pole shoe, a stationary contact on said frame in electrical engagement with said movable contact when said movable contact is in normal engagement with said first pole shoe, said stationary and movable contacts being connected in a feed interruption circuit to actuate the same upon engagement of said contacts, said movable contact being positioned adjacent said support to be pivoted by said article when said article is properly positioned on the support in the direction toward said second pole shoe, and means for periodically energizing said electromagnet in timed relation with the feed of said article to attract the movable contact to said second pole when said article is properly positioned on the support and toward said first pole when said article is improperly positioned on the support.

2. Apparatus as defined in claim 1 wherein said frame is laterally movable relative to said support, said support constituting another stationary contact, said frame having an auxiliary contact thereon in electrical engagement with said support in the absence of an article positioned therebetween when said frame is in engagement with said support, said support and said auxiliary contact being connected in an electrical circuit of said feed means.

3. An article sensing device comprising a frame, an electromagnet secured to said frame, said electromagnet having first and second spaced pole shoes, a movable switch contact pivotally connected to said frame and having a magnetic portion intermediate said pole shoes, said movable switch contact normally having a position in engagement with said first electromagnetic pole shoe, a stationary switch contact on said frame in electrical engagement with said movable contact when said movable contact is in normal engagement with said first pole shoe, said movable contact being arranged to be pivoted by said article in the direction of said second pole shoe, and means for periodically energizing said electromagnet in timed relation to the presence of said article to attract the movable contact to said second pole out of engagement with said stationary contact.

4. Apparatus as defined in claim 3 and further including another stationary contact secured to said frame adjacent said second pole shoe for electrical engagement by said movable contact when said movable contact is in engagement with said second pole shoe.

References Cited in the file of this patent

UNITED STATES PATENTS

| | | |
|---|---|---|
| 2,404,227 | Hall | July 16, 1946 |
| 2,636,933 | Lecher | Apr. 28, 1953 |
| 2,709,960 | Alix | June 7, 1955 |
| 2,739,572 | Page | Mar. 27, 1956 |